(No Model.)

F. W. OSTROM.
BATHER'S APPLIANCE.

No. 450,318. Patented Apr. 14, 1891.

WITNESSES:
J. Finch
Chas. M. Fleming

INVENTOR
Freeland W. Ostrom
BY
F. W. Smith Jr.
ATTORNEY

THE NORRIS PETERS CO., PHOTO-LITHO., WASHINGTON, D. C.

UNITED STATES PATENT OFFICE.

FREELAND W. OSTROM, OF BRIDGEPORT, CONNECTICUT.

BATHER'S APPLIANCE.

SPECIFICATION forming part of Letters Patent No. 450,318, dated April 14, 1891.

Application filed March 28, 1890. Serial No. 345,706. (No model.)

*To all whom it may concern:*

Be it known that I, FREELAND W. OSTROM, a citizen of the United States, residing at Bridgeport, in the county of Fairfield and State of Connecticut, have invented certain new and useful Improvements in Bather's Appliances; and I do hereby declare the following to be a full, clear, and exact description of the invention, such as will enable others skilled in the art to which it appertains to make and use the same.

My invention relates to certain new and useful improvements in toilet-cases, but has especial reference to that class of such devices known as "bather's appliances," and has for its object to provide a receptacle for a sponge, soap, and towel, which shall permit of the rapid drying of the soap and ready draining and evaporation of the water in the sponge, whereby the latter cannot become sour or stale, and the securing of the towel in such manner that it cannot be stolen, while at the same time it may be left free to hang and dry by the natural evaporation of the dampness.

Prior to my invention bath-lockers, especially in gymnasiums, have been so constructed that although ventilated after a fashion the several implements contained therein, especially the sponge and towel, were generally found when required for use in a partially dried, damp, and mildewed state. This is very annoying and unpleasant, and the actual need of a device which shall overcome these difficulties has given birth to this invention.

In order that those skilled in the art to which my invention appertains may fully understand the same, I will proceed to describe its construction in detail, referring by letter to the accompanying drawings, forming a part of this specification, and in which—

Figure 1:
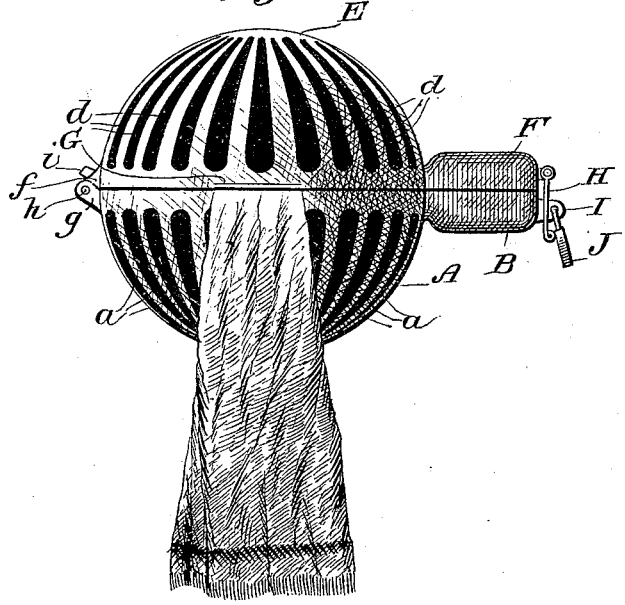
Figure 2:
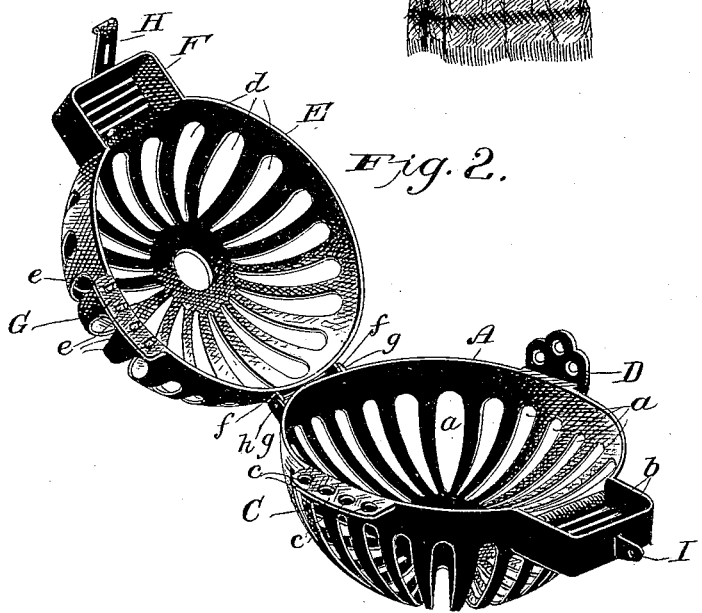
Figure 3:
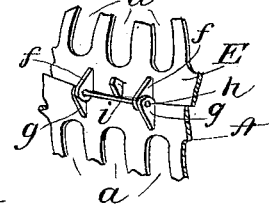

Figure 1 is a front elevation of my improvement; Fig. 2, a perspective of the same, the cover being thrown open, and Fig. 3 a detail broken elevation showing particularly the manner in which I prefer to attach the cover to the bowl.

Similar letters denote like parts in the several figures of the drawings.

A is a bowl or shell, which is cast from metal, and is what is called an "open-work casting," the openings being denoted by $a$.

B is a soap-tray cast with said bowl and extending laterally therefrom, the bottom of said tray having openings $b$.

C is a lip extended like a flange from the front upper edge of the bowl and having perforations $c$.

D is a bracket formed with said bowl, and by means of which the latter may be secured to the wall or any suitable partition.

E is the cover or upper shell, which is made like the bowl and has openings $d$.

F is a lid for the soap-tray, formed integral with said cover, and G is a lip extending from the front of the cover and similar to the lip C.

$e$ are pins depending from the lip G, and adapted to register with the perforations $c$, as will be presently set forth.

The cover and bowl are each provided with lugs $f$ $g$, respectively, which are connected by a pintle $h$, whereby said cover and bowl are hinged together.

$i$ is a stop projecting from the cover in the neighborhood of the hinge and adapted to abut against the edge of the bowl when the cover is thrown back, whereby the latter may be limited as to its backward movement, as shown in Fig. 2.

H is a hasp pivoted to the soap-tray cover.

I is a staple extending from the soap-tray, whereby the locker may be secured by any suitable padlock J.

The relative location of the pins $e$ with respect to the perforations $c$ is such that said pins will extend through said perforations when the cover is closed.

My improvement is adapted for use in the following manner: The sponge is placed within the body of the bowl, the soap within the tray, and the edge of the towel is spread across the perforated lip, so that when the cover is shut down the sponge and soap will both be inclosed, while the pins $e$ in the lips G will force the towel through the perforations in the lip C, and thereby firmly secure said towel as against theft. It will thus be seen that while the soap, the sponge, and the towel are in reality locked up so as to be unavailable, nevertheless they are all as completely exposed to the air for drying purposes as if they were actually left free to swing in the air.

The conditions of my invention being fulfilled by the open-work locker or toilet-case, I do not wish to be confined to any particular way of attaching the cover and bowl together or of securing them. The feature of the bracket by which the device may be secured to a wall can of course be omitted and ordinary means be provided whereby the device can be secured to any convenient part of a room.

While my improvement is a safe means for securing the appliances of a bather, it is always in reality open for inspection, so that any theft may be instantly detected without opening the device.

Of course it is not absolutely necessary that the cover and bowl should be provided with pins and corresponding holes whereby the towel may be held, for any suitable clamping means may be utilized in connection with said bowl and cover, the gist of my invention in this respect resting in the broad idea of clamping the towel between the shells A E; also, while the shells can be cast very cheaply and with good results, I do not desire to be limited to the cast-metal construction, nor do I even wish to be circumscribed by even a metallic construction, for my improvement may readily be made from wire, or it may be struck up in sections from sheet metal, while, on the other hand, I can mold the device from papier-maché, if desired.

The chief feature of my invention is an open-work locker, and the minor details of the soap-tray and towel-clamp may be greatly varied without departing from the spirit of my invention.

Having thus described my invention, what I claim as new, and desire to secure by Letters Patent, is—

1. In a bather's appliance, two open-work shells detachably secured together, the lower shell having formed therewith a soap-tray and a perforated laterally-extending lip, while the upper shell has integral therewith a cover for said tray and a laterally-extending lip provided with pins adapted to register through said perforations, substantially as shown and described.

2. A bather's appliance consisting of two open-work shells hinged together and provided with means whereby they may be locked, each shell being complementary of the other in respect to the soap-dish and receptacle for the sponge, said shells being provided, respectively, with a lip having perforations and a lip having pins adapted to register through said perforations, substantially as shown and set forth.

3. In a bather's appliance comprising two shells adapted to be secured together to form a receptacle, the lip extended from one shell and having projecting pins, in combination with a lip extending from the other shell and provided with perforations through which said pins register, substantially as set forth.

In testimony whereof I affix my signature in presence of two witnesses.

FREELAND W. OSTROM.

Witnesses:
F. W. SMITH, Jr.,
J. S. FINCH.